United States Patent [19]

Kitano et al.

[11] Patent Number: 4,807,730

[45] Date of Patent: Feb. 28, 1989

[54] CLUTCH BRAKE

[75] Inventors: Seiichi Kitano; Yasunobu Fukatani; Masaaki Asada, all of Osaka, Japan

[73] Assignee: Kabushiki Kaisha Daikin Seisakusho, Osaka, Japan

[21] Appl. No.: 181,150

[22] PCT Filed: Jul. 13, 1987

[86] PCT No.: PCT/JP87/00503

§ 371 Date: Jan. 27, 1988

§ 102(e) Date: Jan. 27, 1988

[87] PCT Pub. No.: WO88/00662

PCT Pub. Date: Jan. 28, 1988

[30] Foreign Application Priority Data

Jul. 14, 1986 [JP] Japan ............................ 61-10770[U]

[51] Int. Cl.$^4$ ........................ B60K 41/24; F16D 67/02
[52] U.S. Cl. ............................... 192/13 R; 192/18 R; 192/107 C
[58] Field of Search ................ 192/13 R, 18 R, 107 C

[56] References Cited

U.S. PATENT DOCUMENTS

| | | | |
|---|---|---|---|
| 3,763,977 | 10/1973 | Sink ................................... | 192/13 R |
| 4,186,826 | 2/1980 | Mackendrick et al. ......... | 192/107 C |
| 4,657,124 | 4/1987 | Flotow ............................... | 192/13 C |
| 4,762,215 | 8/1988 | Flotow et al. ................... | 192/107 C |

FOREIGN PATENT DOCUMENTS 51-44269  11/1976  Japan .

Primary Examiner—Leslie A. Bruan
Assistant Examiner—Andrea Pitts
Attorney, Agent, or Firm—Armstrong, Nikaido, Marmelstein & Kubovcik

[57] ABSTRACT

A clutch brake (A) having a brake assembly (B) connectable to a rotatable shaft (3) with driving action accompanied and a cover assembly (C) providing external friction surfaces (29) and (30) and supported rotatably relatively to a brake assembly (B); characterized by that rivets (26) are provided which slidingly connect approximately disc-like, facing-each-other two cover elements (19) and (24) composing a cover assembly (C) with a specified axial clearance (L) left therebetween, an approximately disc-like spring member (31) for pressing the brake assembly (B) is interposed between the cover assembly (C) and the brake assembly (B), the clearance (L) between the cover elements (19) and (24) being so set that a spring force of the spring member (31) is not transmitted to the brake assembly (B) in an initial state where the cover assembly (C) is not pressed and the spring force of the spring member (31) is transmitted to the brake assembly (B) in an engaged state where the cover assembly (C) is pressed.

5 Claims, 4 Drawing Sheets

4,807,730

CLUTCH BRAKE

DESCRIPTION

1. Technical Field

This invention relates to a clutch brake, and especially to one having a brake assembly connectable to a rotatable shaft with driving action accomplished and a cover assembly providing an external friction surface, supported rotatably relatively to said brake assembly and utilized particularly for an asynchronous heavy duty transmission.

2. Background Art

With regard to this kind of clutch brake, the applicant of the present invention has already developed a prior art as illustrated by FIG. 4 and applied it for a patent (Application No.: S61-46786, Date of application: Mar. 4, 1986).

In this prior, a coned disc spring 100 is interposed between a cover assembly C and a brake assembly B so as to improve a torque characteristic produced by the brake assembly B. However, covers 102 and 104 of the cover assembly C are fastened by a hook 106 so that an engagement feeling of the clutch brake is not always good when the cover assembly C is pressed by both pressure surfaces 108 and 108.

Further, said engagement action is done abruptly so that facings 110 will be worn out quickly to a large extent.

DISCLOSURE OF THE INVENTION

An object of the invention is to provide a clutch brake which can make an engagement feeling more smooth and reduce a wear amount of a friction member.

This invention relates to a clutch brake having a brake assembly connectable to a rotatable shaft with driving action accompanied and a cover assembly providing external friction surfaces and supported rotatably relatively to said brake assembly; characterized by that rivets are provided which slidingly connect approximately disc-like facing-each-other two cover elements composing said cover assembly with a specified axial clearance left therebetween, an approximately disc-like spring member for pressing the brake assembly is interposed between the cover assembly and the brake assembly, said clearance between the cover elements being so set that a spring force of the spring member is not transmitted to the brake assembly in an initial state where the cover assembly is not pressed and the spring force of the spring member is transmitted to the brake assembly in an engaged state where the cover assembly is pressed.

BEST MODE FOR CARRYING OUT THE INVENTION

Figure 1:
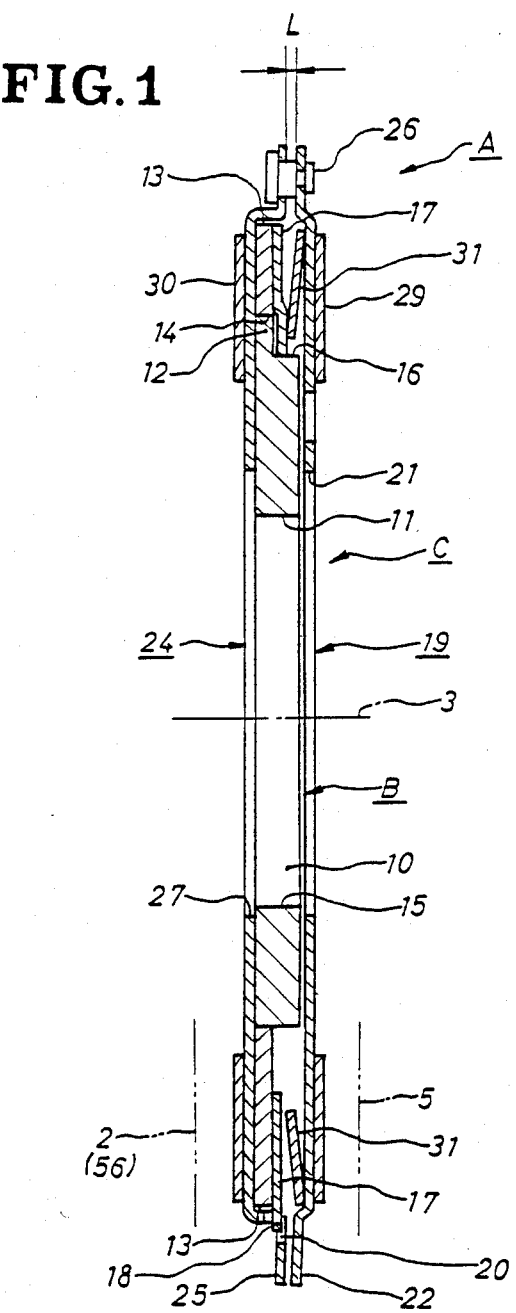
FIG. 1 is a sectional view showing an embodiment of the invention taken on a line I—I of FIG. 2.
Figure 2:
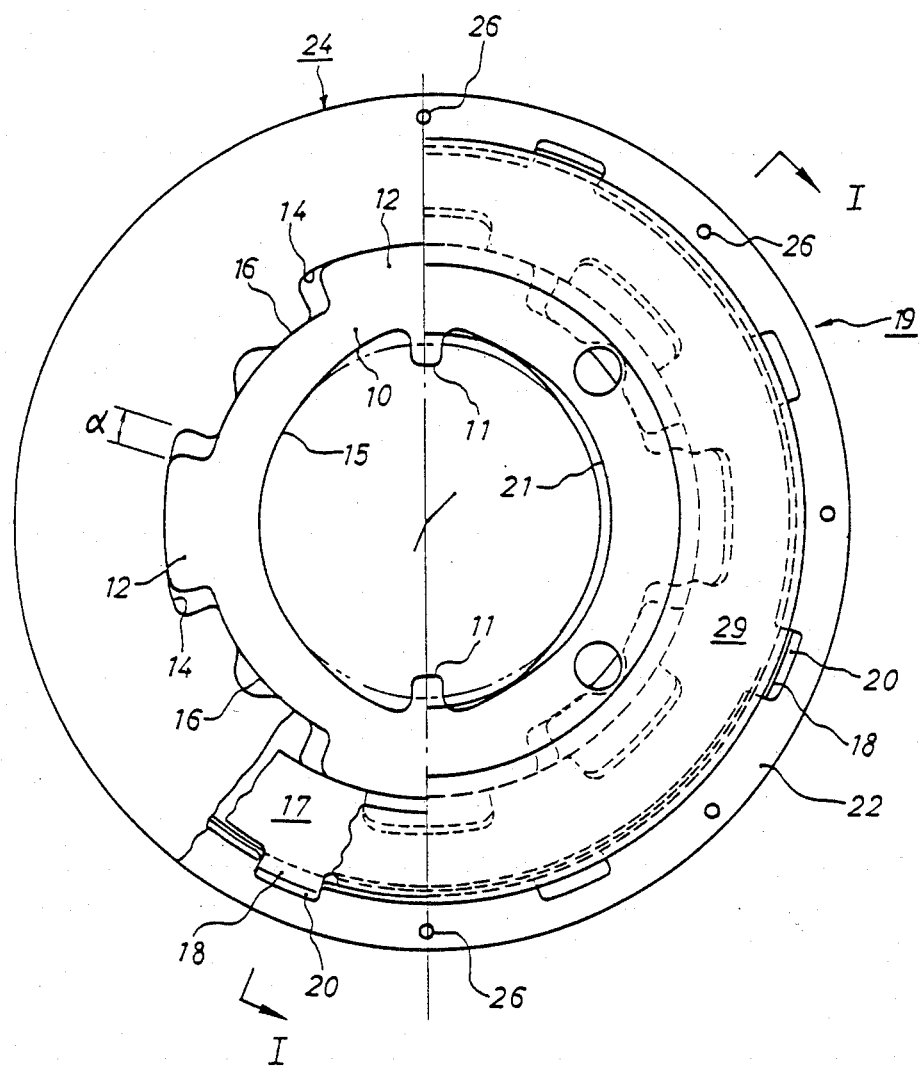
FIG. 2 is a partially fragmental front view.

In FIG. 1 showing the clutch brake according to the present invention, 10 is an approximately annular hub. The hub 10 fits onto an input shaft 3 (only a central line being illustrated) and always rotates together with the input shaft 3. A through hole 15 is formed on an inner peripheral part of the hub 10. The through hole 15 is provided in order to have the input shaft 10 pass through it. Two projections 11, facing one another for example, are formed at specified places of the through hole 15. These projections 11 mesh with the input shaft 3 side so that the hub 10 rotates integrally with the input shaft 3. Projections 12 are formed at four 90-degrees equally spaced places, for example, on an outer peripheral surface of the hub 10. The projections 12 engage with an annular friction member 13, which is positioned at an outer peripheral side of the hub 10. The projection 12 meshes with a recessed part 14 with a specified play $\beta$(FIG. 2) left therebetween. The recessed parts 14 are formed on an inner peripheral surface of the friction member 13. Further, a stepped part 16 is formed on a right side face of the hub 10 in FIG. 1. An inner peripheral surface of a friction plate 17, which will be mentioned later, contacts with the stepped part 16. The brake assembly B is composed of these hub 10 and friction member 13.

A through hole 21 is formed at an axis side of a right side cover 19 (cover element) in FIG. 1. The through hole 21 is provided in order to have the input shaft 3 pass through it. A flange 22 is formed on an outer peripheral part of the cover 19. The flange 22 is a member for connecting the cover 19 and a cover 24.

A through hole 27 is formed at an axis side of the cover 24 (cover element) positioned at a left side of FIG. 1. The through hole 27 is provided in order to have the input shaft 3 pass through it. A flange 25 is formed on an outer peripheral part of the cover 24. The flange 25 is a member for connecting the cover 24 and the cover 19. The flange 25 is spaced from the flange 22 with a clearance L left therebetween. The flange 22 is connected by rivets 26 in such a manner as sliding freely in an axial direction. The rivets 26 are disposed at eight places equally spaced in a circumferential direction, for example.

Annular friction facings 29 & 30 are bonded to outside faces of the cover 19 and the cover 24 respectively. The release bearing 2 and the cap 5 contact with the friction facings 30 and 29 respectively. Thereby, a friction torque of the input shaft 3 is transmitted to the clutch brake.

Holes 20 are formed at plural specified places of an inner peripheral part of the flange 25. The projections 18 of the friction plate 17 mesh with the holes 20. The engagement of the projections 18 with the holes 20 causes integral rotation of the friction plate 17 and the cover 19. Frictions between the friction plate 17 and the friction member 13 and between the cover 24 and the friction member 13 produce a friction torque between the brake assembly B and the cover assembly C.

A coned disc spring 31 (spring member) is interposed between the friction plate 17 and the cover 19. The friction plate 17 is in a state where it can be pressed toward the friction member 13 side appropriately. In an initial state (i.e. at a beginning of installation), the coned disc spring 31 is not in a pressed state and the clearance L between said both flanges 22 and 25 is kept as it is. On the other hand, in an engaged state where the cover assembly B is pressed, the coned disc spring 31 is so set that its spring force supports the both covers 19 & 24 elastically.

Figure 5:
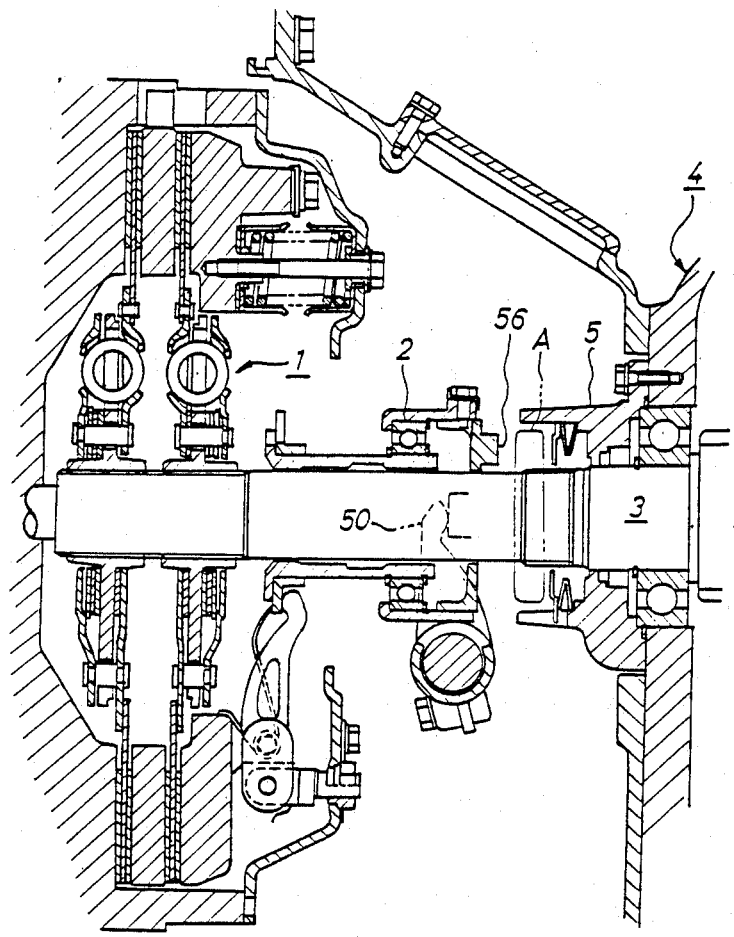
FIG. 5 is a schematic vertical sectional view showing a so-called pull-type clutch employing the clutch brake according to the present invention.

As illustrated by FIG. 5, the above-mentioned clutch brake A is disposed between the cap 5 and a pressing face 56 of the release bearing 2, which is moved by a release lever 50 in the axial directoin of the input shaft 3.

Function will be described hereunder. When the clutch 1 (FIG. 5) is in the engaged state, the clutch brake A rotates freely and integrally with the input shaft 3. When the release bearing 2 moves toward the right side of FIG. 5 to bring about the disengaged state of the clutch 1 (FIG. 5), the clutch brake A is pressed by this release bearing 2 toward the transmission 4 side. Thereby, the release bearing 2 is brought into contact with the cap 5 which is a non-rotation member, and a friction torque is produced between these cap 5 and release bearing 2 and the friction facings 29 and 30. The friction torque is transmitted from an inside face of the cover 24 to the friction member 13, and further from the cover 19 through the friction plate 17 to the friction member 13. Therefore, a brake torque acts on the brake assembly B side, and the brake torque is transmitted from the brake assembly B to the input shaft 3. Since the brake assembly B is connected irrotationally with the input shaft 3 in this instance, an inertia is moderated to ease gear shifting.

The coned disc spring 31 is elastically interposed between the both covers 19 and 24 when the cover assembly C is engaged, so that a shock at the time of engagement is moderated to enable smooth engagement of the cover assembly C.

Figure 3:
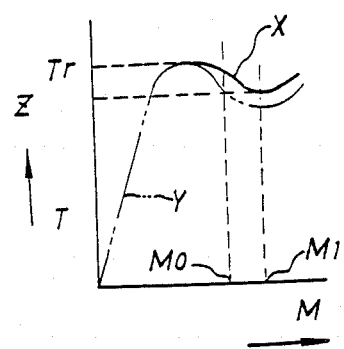
FIG. 3 is a graph showing a torque characteristic in relation to an allowance for wear of friction member.
Figure 4:
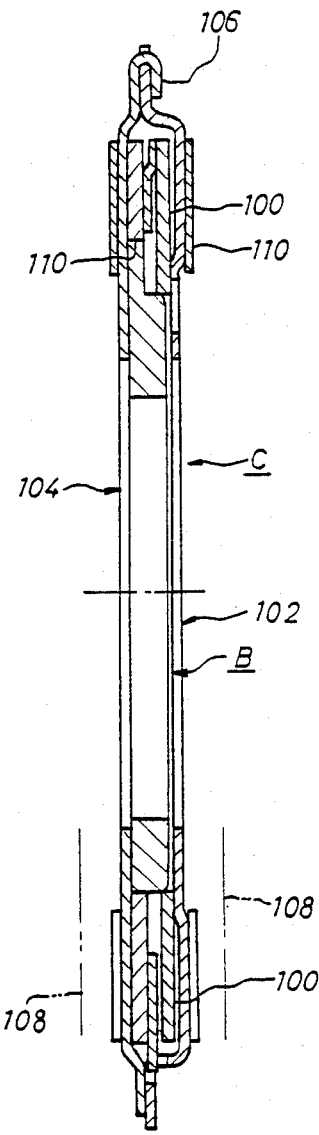
FIG. 4 is a partially fragmental schematic side view showing a conventional embodiment.

Further, in the engaged state of the cover assembly C, a magnitude of the friction torque acting from the friction plate 17 side to the friction member 13 side is restricted by the spring force of the coned disc spring 31. And, a friction member wear allowance/torque characteristic curve as shown by FIG. 3 can be obtained according to the present invention. FIG. 3 shows a change of torque T in relation to a wear allowance M obtained from the characteristic of the coned disc spring 31. A characteristic X represents that of the present invention. In case of the characteristic X, a wear allowance M for reaching a wear limit Z is enlarged from M0 to M1 to attain a long service life as compared with a characteristic Y of the prior art as shown by FIG. 4. Incidentally, Tr in FIG. 3 is a maximum transmitted torque value restricted by the coned disc spring 31.

EFFECT OF THE INVENTION

In the clutch brake according to the present invention, the coned disc spring 31 is installed in the cover assembly C and the clearance L is provided between the both covers 19 and 24. Therefore, at the time of engagement of the cover assembly C, the coned disc spring 31 elastically intervenes between the both covers 19 and 24 so that the shock of engagement can be moderated and the cover assembly C can be engaged smoothly.

Further, since the engagement action of the cover assembly becomes smooth, the wear amounts of the friction facings 29 and 30 can be reduced. Consequently, the service life can be prolonged as compared with the conventional one, as shown by the characteristic X of FIG. 3.

We claim:

1. A clutch brake (A) having a brake assembly (B) connectable to a rotatable shaft (3) with driving action accompanied and a cover assembly (C) providing external friction surfaces (29) and (30) and supported rotatably relatively to said brake assembly (B): characterized by that rivets (26) are provided which slidingly connect approximately disc-like, facing-each-other two cover elements (19) and (24) composing said cover assembly (C) with a specified axial clearance (L) left therebetween, an approximately disc-like spring member (31) for pressing the brake assembly (B) is interposed between the cover assembly (C) and the brake assembly (B), said clearance (L) between the cover elements (19) and (24) being so set that a spring force of the spring member (31) is not transmitted to the brake assembly (B) in an initial state where the cover assembly (C) is not pressed and the spring force of the spring member (31) is transmitted to the brake assembly (B) in an engaged state where the cover assembly (C) is pressed.

2. A clutch brake (A) as set forth in claim 1, in which said brake assembly (B) is composed of a hub (10) and an annular friction member (13) at an outer periphery of and concentrically with said hub (10).

3. A clutch brake (A) as set forth in any one of claim 1 or claim 2, in which a projection (12) at the outer periphery of the hub (10) meshes with a recessed part (14) formed on an inner peripheral surface of the friction member (13) with a specified play (α) left therebetween.

4. A clutch brake (A) as set forth in any one of claim 1 or claim 2, in which said spring member (31) is composed of a coned disc spring.

5. A clutch brake (A) as set forth in claim 3, in which said spring member (31) is composed of a coned disc spring.

* * * * *